US012790950B2

(12) United States Patent
Lefebvre et al.

(10) Patent No.: US 12,790,950 B2
(45) Date of Patent: Nov. 10, 2026

(54) AIRCRAFT ENGINE HAVING A SCROLL CASE WITH INTEGRATED VANES

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/037,901

(22) Filed: Jan. 27, 2025

(65) Prior Publication Data

US 2026/0218616 A1 Jul. 30, 2026

(51) Int. Cl.
*F01D 9/04* (2006.01)
*F01D 25/24* (2006.01)

(52) U.S. Cl.
CPC ............. *F01D 9/041* (2013.01); *F01D 25/24* (2013.01); *F05D 2220/323* (2013.01); *F05D 2240/12* (2013.01)

(58) Field of Classification Search
CPC .......... F01D 9/026; F01D 9/041; F01D 9/042; F01D 25/246; F01D 11/005; F01D 9/023; F01D 9/045; F01D 9/047; F01D 9/048; F05D 2240/12
USPC ................................ 415/184, 186, 189, 205
See application file for complete search history.

(56) References Cited

U.S. PATENT DOCUMENTS

| | | | | |
|---|---|---|---|---|
| 2,421,833 | A | 6/1947 | Cronstedt et al. | |
| 3,363,416 | A | 1/1968 | Ernest et al. | |
| 5,156,534 | A | 10/1992 | Burgy et al. | |
| 6,269,628 | B1 * | 8/2001 | Gates | F01D 9/023 60/804 |
| 6,287,091 | B1 | 9/2001 | Svihla et al. | |
| 7,172,388 | B2 * | 2/2007 | Synnott | F01D 11/005 277/637 |
| 2007/0231123 | A1 * | 10/2007 | Dervaux | F01D 9/06 415/115 |

(Continued)

FOREIGN PATENT DOCUMENTS

| | | |
|---|---|---|
| CN | 206111247 | 1/2017 |
| EP | 4446570 | 10/2024 |

OTHER PUBLICATIONS

English machine translation of CN 206111247U, May 27, 2025.*
European search Report issued on Jun. 30, 2026 for corresponding application No. 26154542.0.

*Primary Examiner* — Courtney D Heinle
(74) *Attorney, Agent, or Firm* — NORTON ROSE FULBRIGHT CANADA LLP

(57) ABSTRACT

An aircraft engine including a scroll case extending around a central axis and having an inlet fluidly connected to a source of combustion gases and an outlet, and a conduit extending around the central axis from the inlet to the outlet. The conduit includes an outer wall and a radially inward inner wall, the outlet defined radially between the inner wall and the outer wall. A turbine is downstream of the outlet of the scroll case relative to a flow of the combustion gases. Vanes are circumferentially distributed around the central axis, the vanes being removably mounted to the scroll case proximate to the outlet of the conduit and radially between the inner wall and the outer wall.

18 Claims, 7 Drawing Sheets

(56) References Cited

U.S. PATENT DOCUMENTS

| | | | |
|---|---|---|---|
| 2011/0308502 | A1 | 12/2011 | Shiraishi |
| 2017/0306791 | A1 | 10/2017 | Biolsi et al. |

* cited by examiner

AIRCRAFT ENGINE HAVING A SCROLL CASE WITH INTEGRATED VANES

TECHNICAL FIELD

The application relates generally to aircraft engines and, more particularly, to scroll cases used in such engines.

BACKGROUND

In certain engine architectures, aerodynamic flow distributors, such as scroll or volute structures, are used to receive combustion gases and to regulate them in a suitable manner before the combustion gases meet stator vanes or rotor blades of the downstream turbine(s). It may be desired to orient the hot gas flow such that it meets downstream turbine blades at a desired angle. Existing ways to do this are satisfactory for their intended purposes, but improvements are sought.

SUMMARY

In accordance with one aspect, there is provided an aircraft engine, comprising: a scroll case extending around a central axis and having an inlet fluidly connected to a source of combustion gases and an outlet, a conduit extending around the central axis from the inlet to the outlet, the conduit including an outer wall and an inner wall located radially inwardly of the outer wall relative to the central axis, the outlet defined radially between the inner wall and the outer wall; a turbine downstream of the outlet of the scroll case relative to a flow of the combustion gases; and vanes circumferentially distributed around the central axis, the vanes removably mounted to the scroll case proximate to the outlet of the conduit and radially between the inner wall and the outer wall.

The aircraft engine as defined above and described herein also includes, in certain embodiments, one or more of the following features, in whole or in part, and in any combination.

In certain embodiments, a vane of the vanes has an inner shroud and an outer shroud, the inner shroud being removably mounted to the inner wall of the conduit via an inner shroud mounting interface, and the outer shroud being removably mounted to the outer wall of the conduit via an outer shroud mounting interface.

In certain embodiments, the outer shroud mounting interface includes an outer hook slidably engageable to an outer slot defined by the outer wall.

In certain embodiments, an outer sealing member disposed within the outer slot and radially compressed between the outer hook and the outer wall.

In certain embodiments, the outer hook and the outer slot includes two outer hooks and two outer slots, each of the outer slots having an opening oriented axially towards the turbine.

In certain embodiments, the inner shroud mounting interface includes an inner tab slidably engageable to an inner slot defined by the inner wall.

In certain embodiments, the inner slot has an opening oriented axially towards the turbine.

In certain embodiments, an inner sealing member disposed within the inner slot and radially compressed between the inner tab and the inner wall.

In certain embodiments, a locking member secured to the inner wall, axial movements of the vanes towards the turbine being blocked by the locking member.

In certain embodiments, the vanes are circumferentially locked to the scroll case via lugs defined by one of the inner shroud and the locking member and slots defined by the other of the inner shroud and the locking member.

There is also provided, in accordance with another aspect, a turbine assembly, comprising: a scroll case extending around a central axis and having an inlet fluidly connected to a source of combustion gases and an outlet, and a conduit extending around the central axis from the inlet to the outlet; a turbine downstream of the outlet of the scroll case relative to a flow of the combustion gases; and vanes circumferentially distributed around the central axis and axially overlapping the conduit, the vanes removably mounted within the conduit of the scroll case.

The turbine assembly as defined above and described herein also includes, in certain embodiments, one or more of the following features, in whole or in part, and in any combination.

In certain embodiments, the conduit has an inner wall and an outer wall disposed radially outwardly of the inner wall relative to the central axis, a vane of the vanes having an inner shroud removably mounted to the inner wall via an inner shroud mounting interface and an outer shroud removably mounted to the outer wall via an outer shroud mounting interface.

In certain embodiments, the outer shroud mounting interface includes an outer hook slidably engageable to an outer slot defined by the outer wall.

In certain embodiments, an outer sealing member disposed within the outer slot and radially compressed between the outer hook and the outer wall.

In certain embodiments, the outer hook and the outer slot includes two outer hooks and two outer slots, each of the outer slots having an opening oriented axially towards the turbine.

In certain embodiments, the inner shroud mounting interface includes an inner tab slidably engageable to an inner slot defined by the inner wall.

In certain embodiments, the inner slot has an opening oriented axially towards the turbine.

In certain embodiments, an inner sealing member disposed within the inner slot and radially compressed between the inner tab and the inner wall.

In certain embodiments, a locking member secured to the inner wall, axial movements of the vanes towards the turbine blocked by the locking member.

In certain embodiments, the vanes are circumferentially locked to the scroll case via lugs defined by one of the inner shroud and the locking member and slots defined by the other of the inner shroud and the locking member.

DESCRIPTION OF THE DRAWINGS

Reference is now made to the accompanying figures in which:

FIGS. 9-11 are three dimensional and cutaway views illustrating an assembly sequence of the stator and vanes to the scroll case.

DETAILED DESCRIPTION

Figure 1:
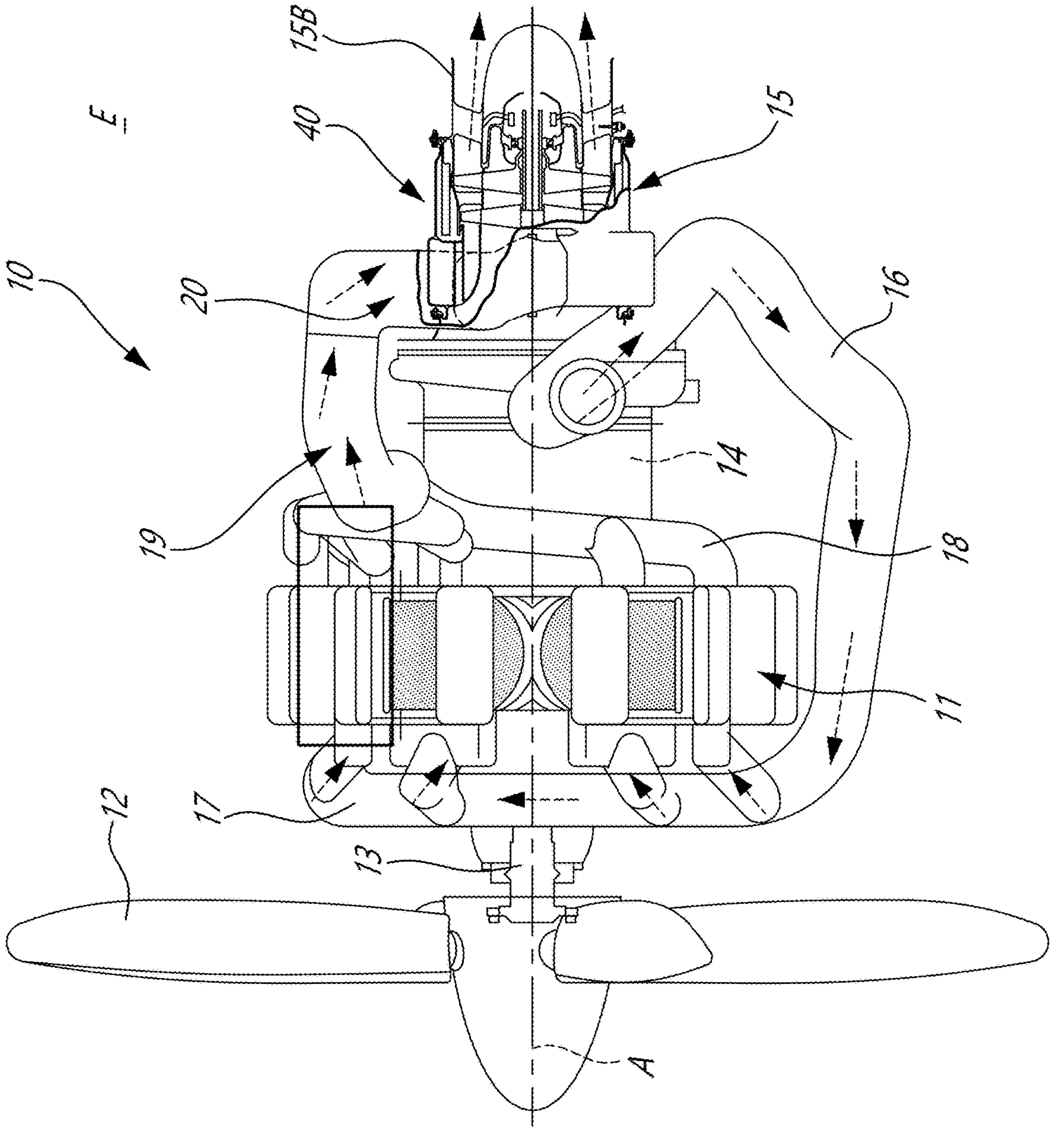
FIG. 1 is a schematic side view of an aircraft engine.

Referring to FIG. 1, an aircraft engine 10 is schematically shown. The aircraft engine 10 comprises a thermal engine module 11 including one or more internal combustion engine(s), drivingly engaged to a rotatable load 12, herein depicted as a propeller, via an output shaft 13. It will be appreciated that the thermal engine module 11 may include any suitable engine, such as a gas turbine engine, a rotary engine, a piston engine, and so on. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines). The aircraft engine 10 further includes a compressor 14 having a compressor inlet receiving ambient air from the environment E outside the aircraft engine 10 and a compressor outlet fluidly connected to an air inlet of the thermal engine module 11. The compressor 14 outputs compressed air from the compressor outlet to the thermal engine module 11 via a compressed air conduit 16 and a manifold 17. The compressed air conduit 16 and the manifold 17 may include any suitable arrangement of pipes configured to distribute compressed air between the different combustion chambers of the thermal engine module 11. Any other suitable configurations used to supply compressed air to the thermal engine module 11 are contemplated without departing from the scope of the present disclosure. The aircraft engine 10 further includes a turbine 15 having an axially facing turbine inlet 15A (FIG. 2) fluidly connected to an engine outlet of the thermal engine module 11. The turbine 15 has a turbine exhaust case 15B via which combustion gases are expelled to the environment E. The turbine exhaust case 15B may include a tailpipe or any other suitable structures (e.g., exhaust mixer) for discharging the combustion gases from the aircraft engine 10. In some embodiments, the aircraft engine 10 may be a hybrid engine including an electric motor drivingly engaged to the output shaft 13 to assist the thermal engine module 11 in driving the output shaft 13 and the rotatable load 12 (e.g., propeller 12) mounted thereto.

Figure 2:
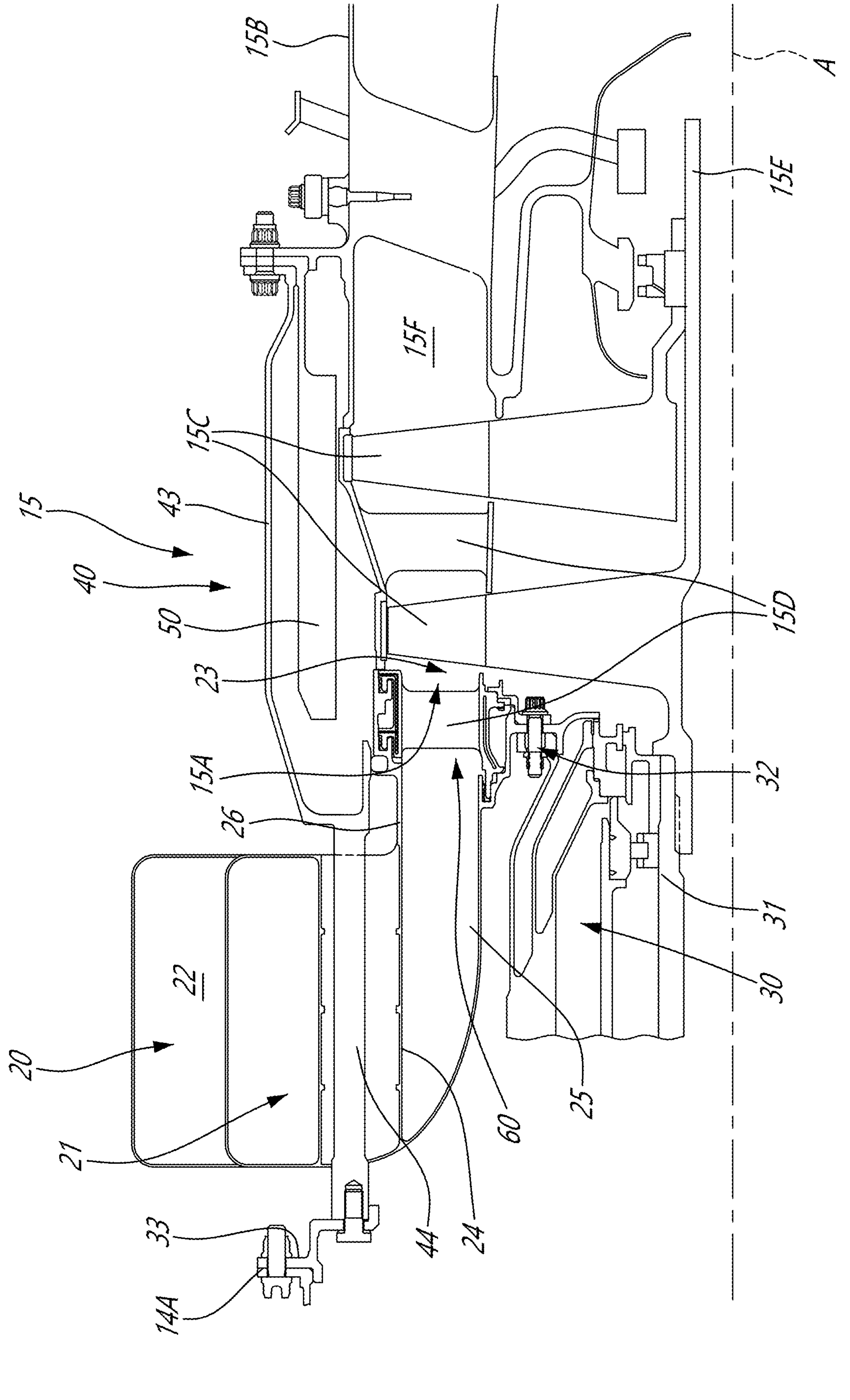
FIG. 2 is a side cross-sectional view of a portion of the aircraft engine of FIG. 1 illustrating a hot section of the aircraft engine including a scroll case.

Referring jointly to FIGS. 1-2, in one or more embodiment(s), the turbine 15 includes an axial turbine having successive rows of rotor(s) 15C and stator(s) 15D disposed in alternation along a central axis A of the aircraft engine 10. The rotor(s) 15C may include rotor blades mounted to rotor discs. The stator(s) 15D may include stator vanes secured at opposite ends to inner and outer shrouds. In other words, the turbine 15 may include a plurality of stages each including a stator and a rotor. The rotors 15C of the turbine 15 are in driving engagement with a turbine shaft 15E. The turbine shaft 15E may be drivingly engaged to the output shaft 13, which may correspond to the engine shaft of the thermal engine module 11. Therefore, the turbine 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor 14. Thus, the turbine 15 may drive both the rotatable load 12 and the compressor 14. In the exemplified embodiment, the engine shaft of the thermal engine module 11, the output shaft 13, and the turbine shaft 15E are all coaxial about the central axis A. However, in other configurations, the turbine 15 and/or the compressor 14 may have respective shafts radially offset from one another relative to the central axis A.

As shown in FIG. 1, the engine outlet of the thermal engine module 11 is fluidly connected to an exhaust manifold 18 that receives combustion gases outputted by the combustion chambers or by a combustor of the thermal engine module 11. The exhaust manifold 18 collects the combustion gases from the different combustion chambers and flows these combustion gases to a combustion engine exhaust pipe 19 that feeds the combustion gases to the turbine 15. In other words, the engine outlet of the thermal engine module 11 is fluidly connected to the turbine inlet 15A via the exhaust manifold 18 and the combustion engine exhaust pipe 19. Any other suitable configurations used to supply combustion gases to the turbine 15 are contemplated without departing from the scope of the present disclosure.

As schematically depicted by the flow arrows in FIG. 1, the combustion gases are flowing within the combustion engine exhaust pipe 19 and reach the turbine 15 in a direction being mainly radial relative to the central axis A and which may include a circumferential component relative to the central axis A. However, the turbine 15 includes an axial turbine and therefore the turbine inlet 15A receives the combustion gases along a direction being mainly axial relative to the central axis A. To redirect the combustion gases from a direction being mainly radial to a direction being mainly axial, that is, to decrease a radial component of a direction of the combustion gases, the aircraft engine 10 further includes a scroll case 20 that regulates and reorients the combustion gases so that they meet an upstream most of the stages of the turbine 15 at the most appropriate angle of attack. The scroll case 20 may therefore be used to adequately orient the combustion gases at the most appropriate angle to meet upstream-most airfoils of the turbine 15.

Still referring to FIG. 2, as shown in the exemplified embodiment, the scroll case 20 may be provided in form of a unitary body or mono-case comprising a conduit 21 extending around the central axis A from an inlet 22 to an outlet 23. The inlet 22 is fluidly connected to the combustion engine exhaust pipe 19, whereas the outlet 23 is fluidly connected to the turbine inlet 15A of the turbine 15. According to the illustrated embodiment, the inlet 22 of the conduit 21 has a tangential component and the outlet 23 is an annular outlet facing axially in a rearward direction and in alignment with an annular gas path 15F of the turbine 15. This configuration allows injecting the combustion gases in a direction being mainly axial relative to the central axis A to meet the axial inlet of the turbine 15. Vanes 24 may be provided in the conduit 21 to direct and regulate the flow of combustion gases. The vanes 24 may be omitted in some embodiments. The conduit 21 of the scroll case 20 is in this embodiment disposed axially forwardly of the turbine 15.

The conduit 21 comprises a non-axisymmetric portion extending downstream from the inlet 22 and spiraling towards the central axis A. As it progresses circumferentially around the central axis A, the non-axisymmetric portion of the conduit 21 transitions or merges with an axisymmetric portion, which forms a 360 degrees axisymmetric structure around the central axis A. The axisymmetric portion extends downstream from the non-axisymmetric portion to the outlet 23.

The inventors have found that in engine running conditions, the thermal distortions are non-uniform in the non-axisymmetric portion of the scroll case 20. Consequently, using the scroll case 20 to secure the turbine exhaust case 15B may increase tip clearance of the rotors 15C of the turbine 15. In other words, radial thermal growth of the scroll case 20 during use of the engine may move the turbine exhaust case 15B radially outwardly, thus pulling radially on shrouds disposed around the rotors 15C. This may increase tip clearance and, as a result, may impair performance. As will be seen hereafter, a turbine support case arrangement may be used to alleviate these drawbacks.

As illustrated on FIG. 2, a compressor case 14A of the compressor 14 is radially supported by a bearing housing 30. It will be appreciated that that any suitable support structure may be used for supporting the compressor case 14A. For instance, the support structure may be any static component of the engine, such as a support flange and so on. Bearings 31 are rollingly engaged to the bearing housing 30 and radially support a shaft of the engine. The scroll case 20 is secured to a rear end 32 of the bearing housing 30. In the exemplified embodiment, the scroll case 20 has a radially-inner wall 25 that defines a flange at its rear end. The flange of the radially-inner wall 25 is engaged to the rear end 32 of the bearing housing 30. Other configurations are however contemplated. Therefore, the scroll case 20 may not rely on the turbine exhaust case 15B for structural support.

In the disclosed embodiment, a turbine support case 40 is used to secure the turbine exhaust case 15B to the compressor case 14A of the compressor 14. As will be explained below, the turbine support case 40 is independent from the scroll case 20 such that thermal growth of the scroll case 20 may not be transmitted to the turbine exhaust case 15B. Therefore, the turbine exhaust case 15B is secured to the compressor case 14A via the turbine support case 40 independently of the scroll case 20. In the present disclosure, the expression "independent" or "independently" in "independently of the scroll case 20" implies that a load path extends from the compressor case 14A to the turbine exhaust case 15B through the turbine support case 40 without intersecting the scroll case 20. The scroll case 20 is therefore free from intersection to the load path from the compressor case 14A to the turbine exhaust case 15B. The scroll case 20 is thus not part of the load path from the compressor case 14A to the turbine exhaust case 15B and loads generated by the turbine 15 on the turbine exhaust case 15B are transmitted to the compressor case via the turbine support case 40 without assistance from the scroll case 20. The scroll case 20 is thus outside the load path that extends through the turbine support case 40. The scroll case 20 may thus be structurally floating relative to the turbine support case 40.

Figure 3:
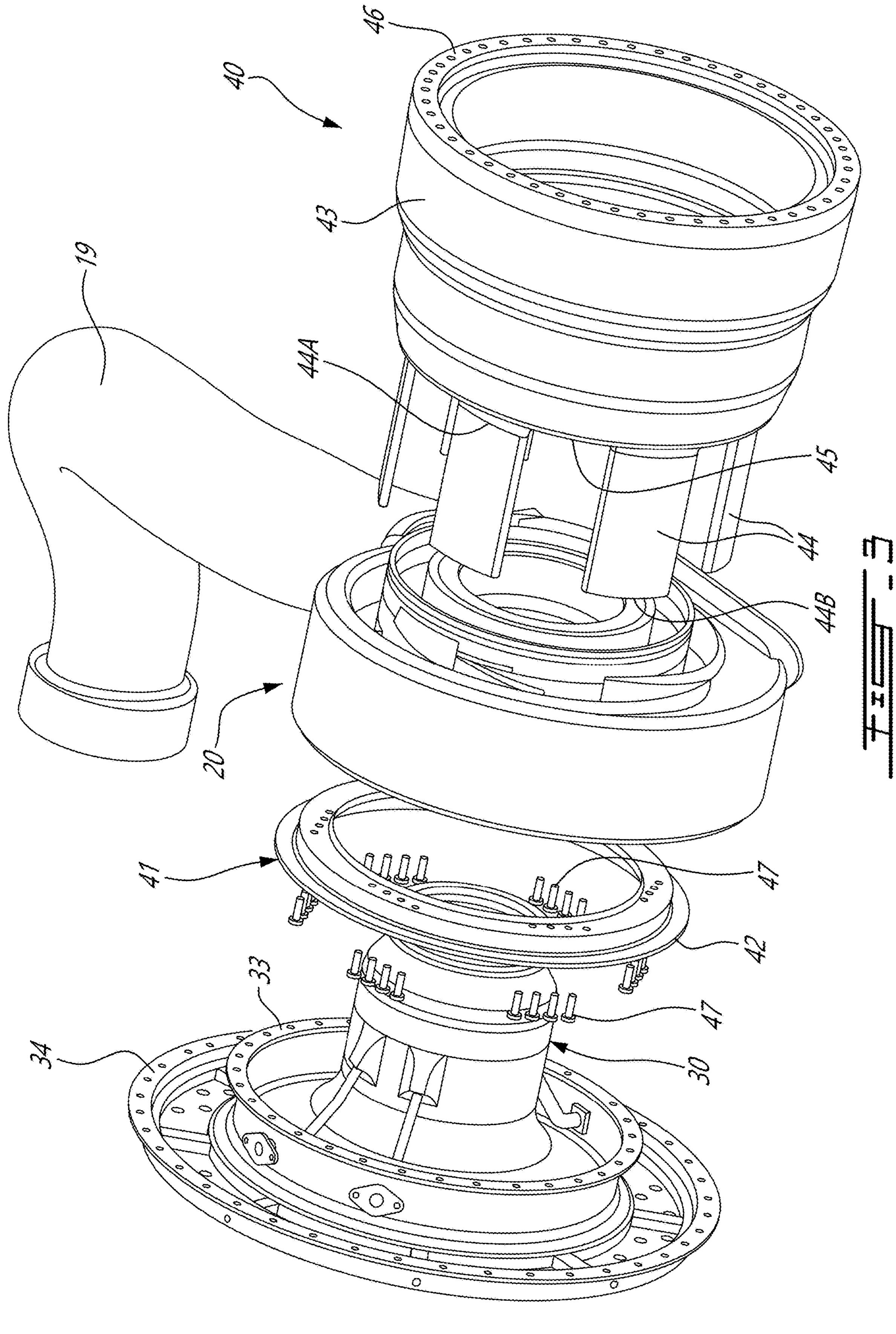
FIG. 3 is a three dimensional exploded view of the portion of the aircraft engine depicted in FIG. 2.

Referring to FIG. 3, the turbine support case 40 has a portion that axially overlaps the scroll case 20 and is secured to an annular member 41, which is itself secured to the bearing housing 30 or any other suitable support structure. More specifically, the annular member 41 has a flange 42 secured (e.g., bolted) to a first flange 33 of the bearing housing 30. The bearing housing 30 further has a second flange 34, which may be disposed radially outwardly of the first flange 33 and axially offset from the first flange 33, for being secured (e.g., bolted) to a mating flange of the compressor case 14A.

The turbine support case 40 includes a wall 43 extending around the central axis A. The wall 43 may be cylindrical, frustoconical, or any other suitable shape. The wall 43 may extend a full circumference around the central axis A. The turbine support case 40 further includes spokes 44 protruding from the wall 43. More specifically, the turbine support case 40 includes an annular axial wall 45 extending radially inwardly from the wall 43. The spokes 44 protrude in a direction having an axial component relative to the central axis A from the annular axial wall 45 and away from the wall 43. The spokes 44 may be parallel to the central axis A. An annular flange 46 is provided at a rear end of the wall 43 and is secured (e.g., bolted) to a mating flange of the turbine exhaust case 15B.

As shown in FIG. 2, the wall 43 axially overlaps at least a portion of the turbine 15. A containment ring 50 may be secured to a flange of the turbine exhaust case 15B via a containment ring flange, which may be sandwiched between the annular flange 46 of the turbine support case 40 and the flange of the turbine exhaust case 15B. The containment ring 50 is, in this embodiment, disposed radially between the wall 43 of the turbine support case 40 and at least one of the rotors 15C of the turbine 15.

The spokes 44, six in the illustrated embodiment, but more or less may be used, extend from proximal ends 44A at the annular axial wall 45 to distal ends 44B. The distal ends 44B of the spokes 44 are secured to the annular member 41. The distal ends 44B of the spokes may define threaded apertures threadingly engageable by fasteners 47 (e.g., bolts) extending through correspondingly-shaped apertures defined through the annular member 41 and threadingly engaged to the threaded apertures for securing the spokes 44 to the annular member 41, which is itself secured to the bearing housing 30.

In the embodiment shown, each of the spokes 44 is received within a respective one of the hollow vanes 24 of the scroll case 20. The spokes 44 therefore axially overlap the vanes 24. Thus, the spokes 44 may be isolated from combustion gases flowing through the scroll case 20 by the vanes 24. The spokes 44 may be free of connection to the vanes 24. In other words, outer surfaces of the spokes 44 may be free of contact with inner surfaces of the vanes 24. An annular gap may be provided between the inner surface of each vanes 24 and the associated spokes 44 extending internally therethrough. The vanes 24 may move axially, radially, and/or circumferentially relative to the spokes 44 without transferring any forces to the spokes 44, and vice versa. Put differently, the scroll case 20 is free from direct connection to the turbine support case 40. In other words, the scroll case 20 is free of contact, attachment, so on with the turbine support case 40. The spokes 44 of this embodiment have an elongated, airfoil-like shape to substantially match a shape of the vanes 24. However, the shape of the spokes 44 may be different. The spokes 44 may be circular, oval, square, rectangular in cross-section and so on, without departing from the scope of the present disclosure.

Inventors of the present disclosure found that to meet the technical requirements, an upstream-most stator encountered by the combustion gases flowing within the scroll case 20 may benefit from being designed in such a way as to be able to control the hot gas exit flow. This is done by selecting a flow circulating area defined between trailing edges of adjacent stator vanes. However, in some cases, testing of the engine may show that this flow circulating area is not optimal. To be able to change this area, this upstream-most stator may be replaced by another having a different area. The disclosed scroll case 20 thus incorporates the upstream-most stator. This arrangement may allow using either a classified vane ring, or the vane segments. Having this structure may allow cost savings because the vane casing is not an integral part of the scroll, which may simplify the manufacture of the scroll.

Figure 4:
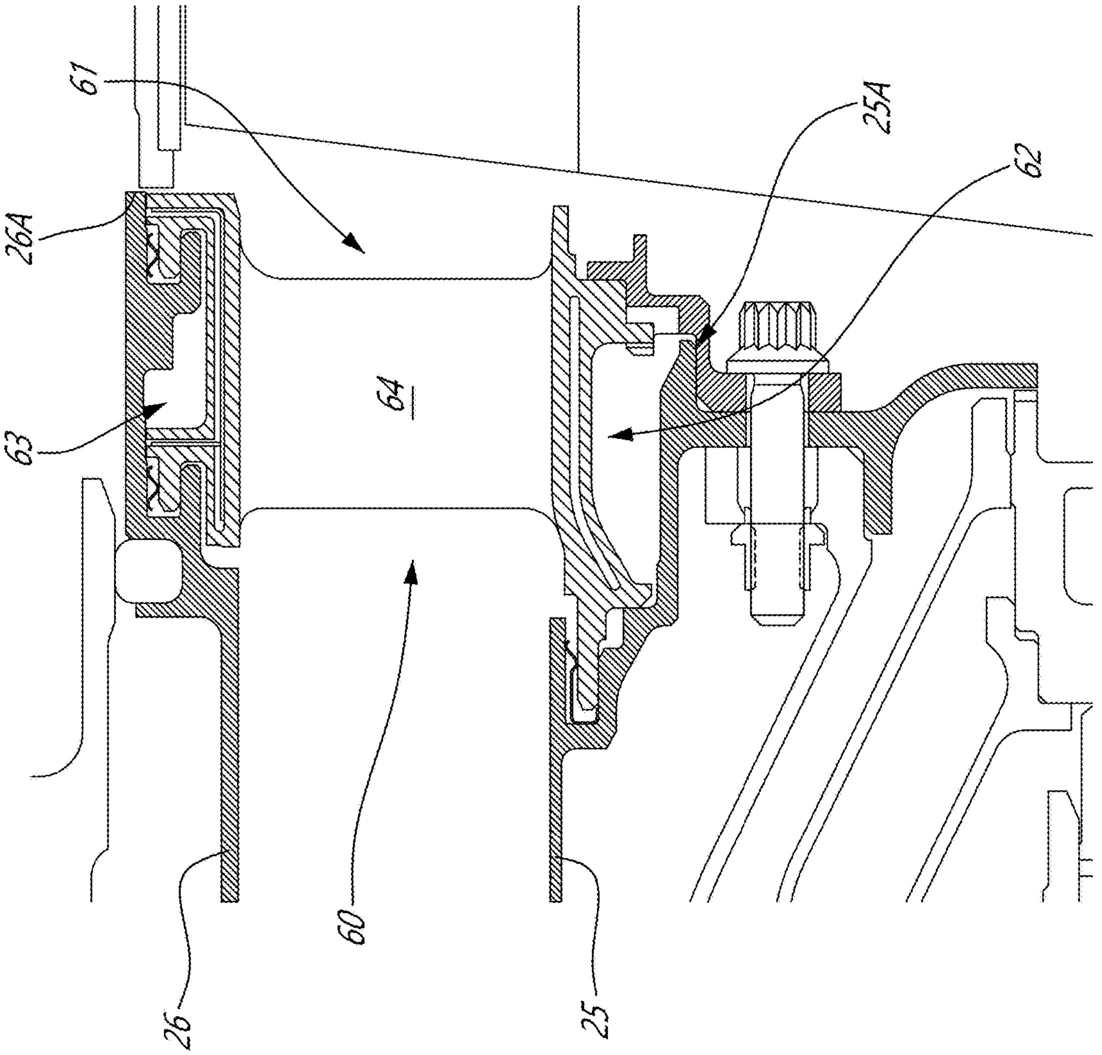
FIG. 4 is an enlarged view of a portion of FIG. 3 illustrating a stator including vanes.

Referring to FIGS. 2 and 4, the scroll case has the inner wall 25 and an outer wall 26 located radially outwardly of the inner wall 25 relative to the central axis A. The outlet 23 of the scroll case 20 is defined radially between the inner wall 25 and the outer wall 26. The outlet 23 faces an axial direction towards the turbine 15. In this embodiment, a stator 60 is disposed within the conduit 21 of the scroll case 20. The stator 60 includes vanes 61 circumferentially distributed around the central axis A. The vanes 61 are non-rotatable relative to the scroll case 20. The vanes 61 are removably mounted to the scroll case 20 proximate to the outlet 23 of the conduit 21 and radially between the inner wall 25 and the outer wall 26. A major portion of the vanes 61 is located upstream of downstream-most ends of the inner and outer walls 25, 26. Herein, the expression "major" implies at least 50% of an axial length of the vanes 61. The stator 60 and its vanes 61 are removably mounted within the conduit 21 of the scroll case 20 upstream of the outlet 23 of the scroll case 20 and radially between the inner wall 25 and the outer wall 26. In other words, the conduit 21 of the scroll case 20 ends at a rear end, which is defined between a rear end 25A of the inner wall 25 and a rear end 26A of the outer wall 26. At least a portion of the stator 60 and the vanes 61 is axially overlapping the conduit 21 of the scroll case 20 by being located upstream of the rearward end. In other words, an axial overlap is defined between the stator 60 and the inner and outer walls 25, 26 of the scroll case 20.

Referring more particularly to FIG. 4, the vanes 61 are described in more detail using the singular form, but the below description may apply to all of the vanes 61. In some embodiments, the vanes 61 are part of a vane ring including an inner shroud 62 and an outer shroud 63 located radially outwardly of the inner shroud 62 relative to the central axis A. Airfoils 64 are located radially between the inner shroud 62 and the outer shroud 63. The vane ring may be a single monolithic part defining all of the airfoils 64 and the inner and outer shrouds 62, 63 of the stator 60. Alternatively, the vanes 61 may be defined by a plurality of segments assembled to one another to complete a fully circumferential assembly. Each segments may include one or more airfoils 64, an inner shroud segment and an outer shroud segment. The description below applies to both configuration regardless of whether the stator 60 includes a vane ring or ring segments. When a ring segments configuration is used, feather seals are inserted within correspondingly-shaped slots defined into the inner shroud and outer shroud to seal gaps defined circumferentially between adjacent shrouds. In some embodiments, the stator 60 may be considered a part of the turbine 15; said part being incorporated in the scroll case 20. An axial overlap may thus be present between the turbine 15 and the scroll case 20.

Figure 5:
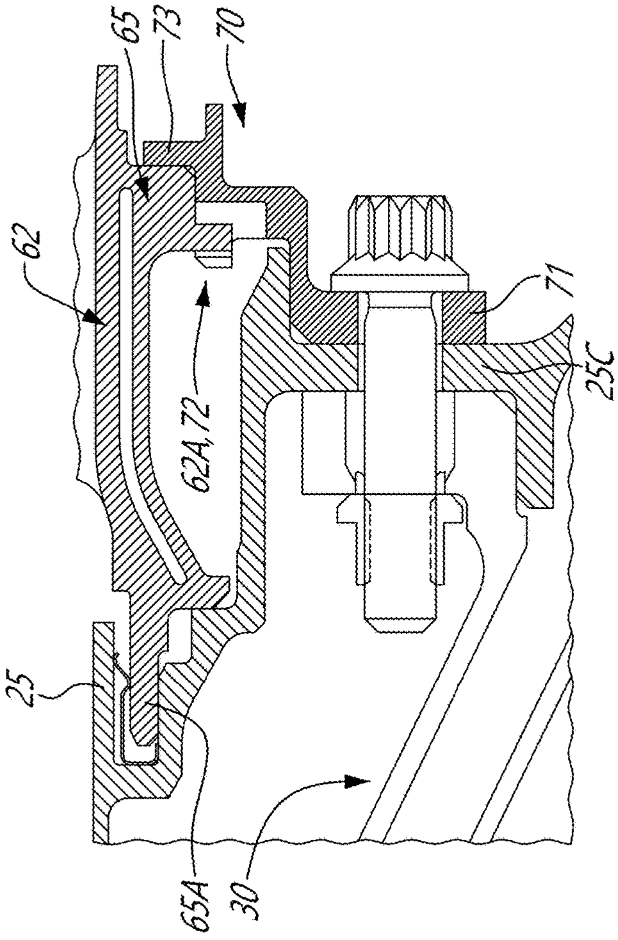
FIG. 5 is an enlarged view of a portion of FIG. 4 illustrating an inner shroud of the vanes.
Figure 6:
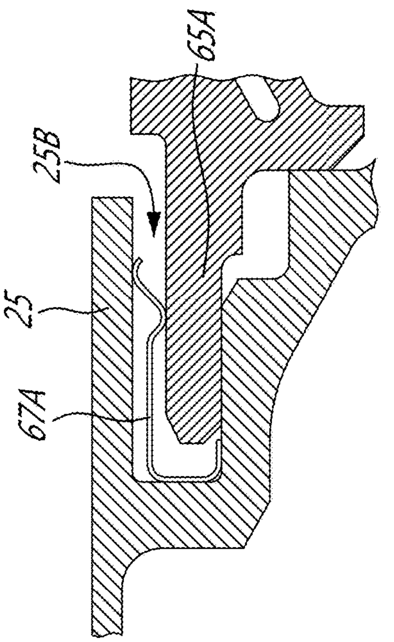
FIG. 6 is an enlarged view of a portion of FIG. 5.

Referring to FIGS. 5-6, the inner shroud 62 is removably mounted to the inner wall 25 via an inner shroud mounting interface 65. In some embodiments, the inner shroud mounting interface 65 includes an inner tab 65A slidably engageable to an inner slot 25B defined by the inner wall 25. The inner slot 25B has an opening oriented axially towards the turbine 15. This allows the vanes 61 to be installed via the outlet 23 of the conduit 21 of the scroll case 20 and to be removed via the outlet 23 of the scroll case 20. To limit combustion gases from leaking out of the annular gas path 15F, an inner sealing member 67A is disposed within the inner slot 25B and radially compressed between the inner tab 64A and the inner wall 25. The inner sealing member 67A may be a crush seal or any suitable seals made of a suitable material designed to withstand the hot conditions in this area of the engine. The inner sealing member 67A may, further to limit leakage, ensure a snug fit between the inner shroud 62 and the inner wall 25.

To prevent the vanes 61 to rotate about the central axis A relative to the scroll case 20, a locking member 70 is secured to the inner wall 25 and is configured to block axial movements of the vanes 61 relative to the central axis A while preventing rotation of the vanes 61 about the central axis A. The locking member 70 has a flange 71 fastened (e.g., via bolts and nuts) to a flange 25C defined by the inner wall 25 of the scroll case 20. Both of these flanges may be secured to a supporting structure of the engine such as, for instance, the bearing housing 30. The locking member 70 defines lugs 72 circumferentially distributed about the central axis A whereas the inner shroud 62 defines slots 62A engageable by the lugs 72. It will be appreciated that the lugs may instead be defined by the inner shroud 62 and the slots defined by the locking member 70. The interlocking of the slots 62A and the lugs 72 thus prevents a relative rotation between the vanes 61 and the scroll case 20. The locking member 70 further defines a rear stopper 73 abutting the inner shroud 62 to prevent the vanes 61 from moving towards the turbine 15. The rear stopper 73 defines an abutment face oriented axially away from the turbine 15.

Figure 7:
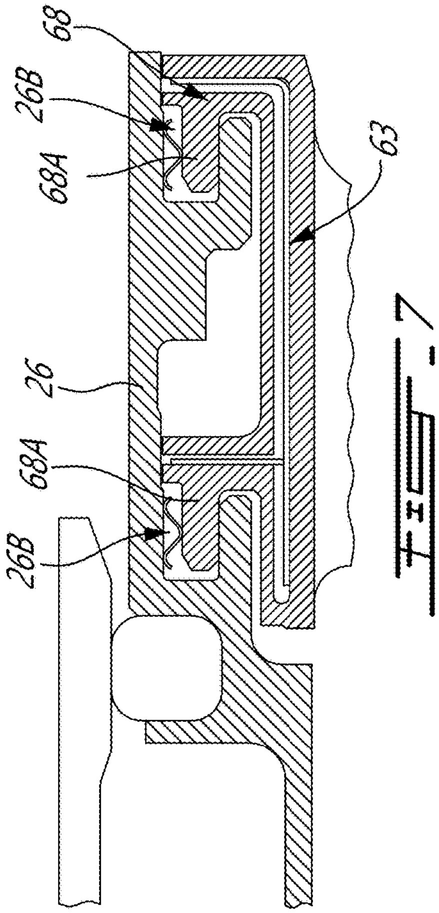
FIG. 7 is an enlarged view of a portion of FIG. 4 illustrating an outer shroud of the vanes.
Figure 8:
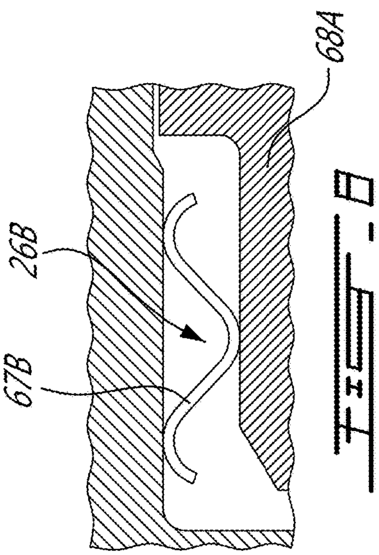
FIG. 8 is an enlarged view of a portion of FIG. 7.
Figure 6:
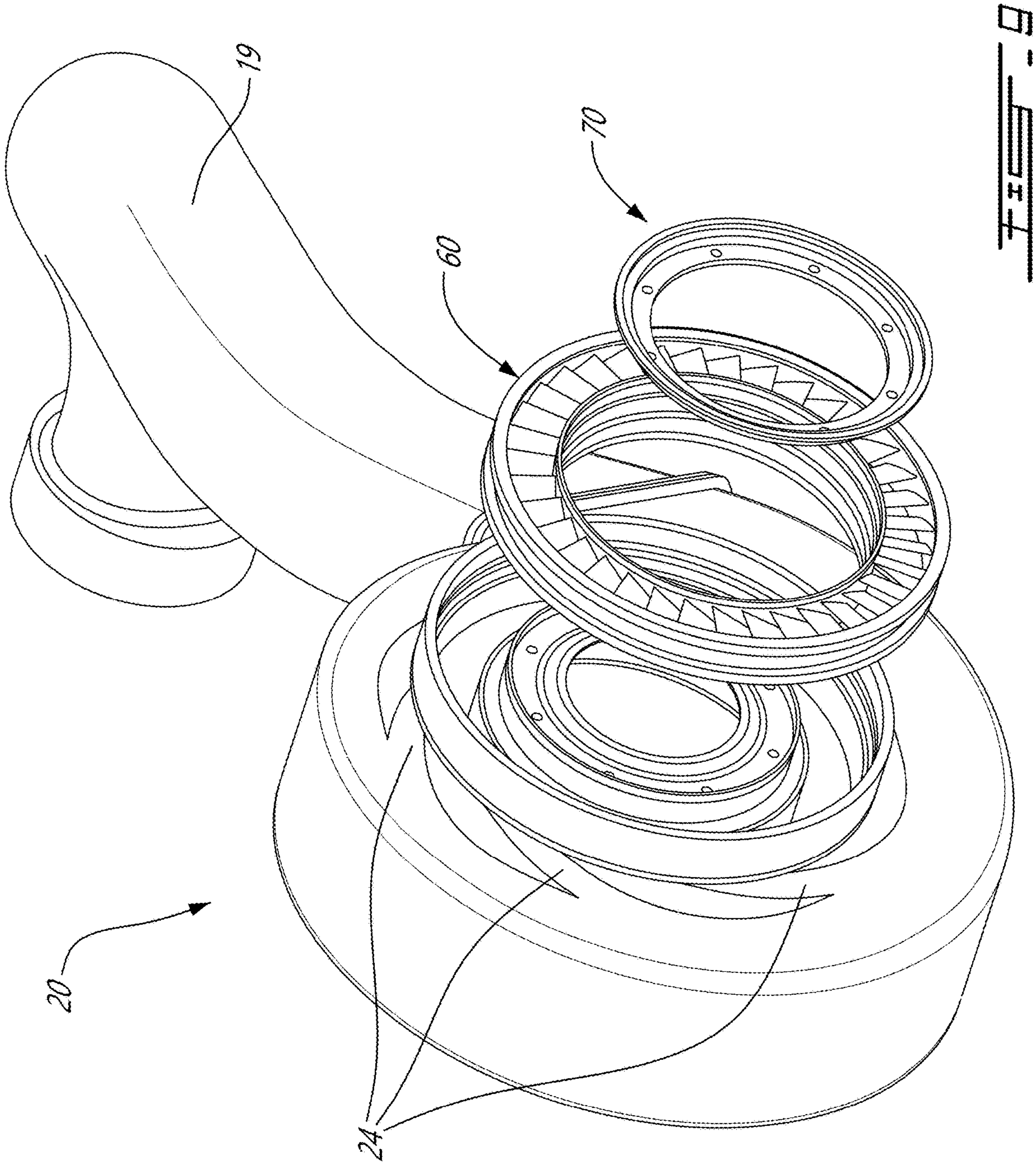

Referring now to FIGS. 7-8, the outer shroud 63 is removably mounted to the outer wall 26 via an outer shroud mounting interface 68. In some embodiments, the outer shroud mounting interface 68 includes outer hooks 68A slidably engaged to outer slots 26B defined by the outer wall 26. In this embodiment, two hooks and two slots being axially offset from one another are provided. However, only one or more than two hooks/slots may be used in some embodiments. As for the inner slot 25B, the outer slots 26B have respective openings oriented axially towards the turbine 15 to allow installation of the vanes 61 via the outlet 23 of the conduit 21 of the scroll case 20 and to be removed via the outlet 23 of the scroll case 20. The slots of both mounting interface face a common axial direction to allow the insertion of the tab/hook in the respective slots.

To limit combustion gases from leaking out of the annular gas path 15F, outer sealing members 67B are disposed within the outer slots 26B and radially compressed between the outer hooks 68A and the outer wall 26. The outer sealing members 67B may be crush seals or any suitable seals made of a suitable material designed to withstand the hot conditions in this area of the engine. The outer sealing member 67B may, further to limit leakage, ensure a snug fit between the outer shroud 36 and the outer wall 26.

Figure 11:
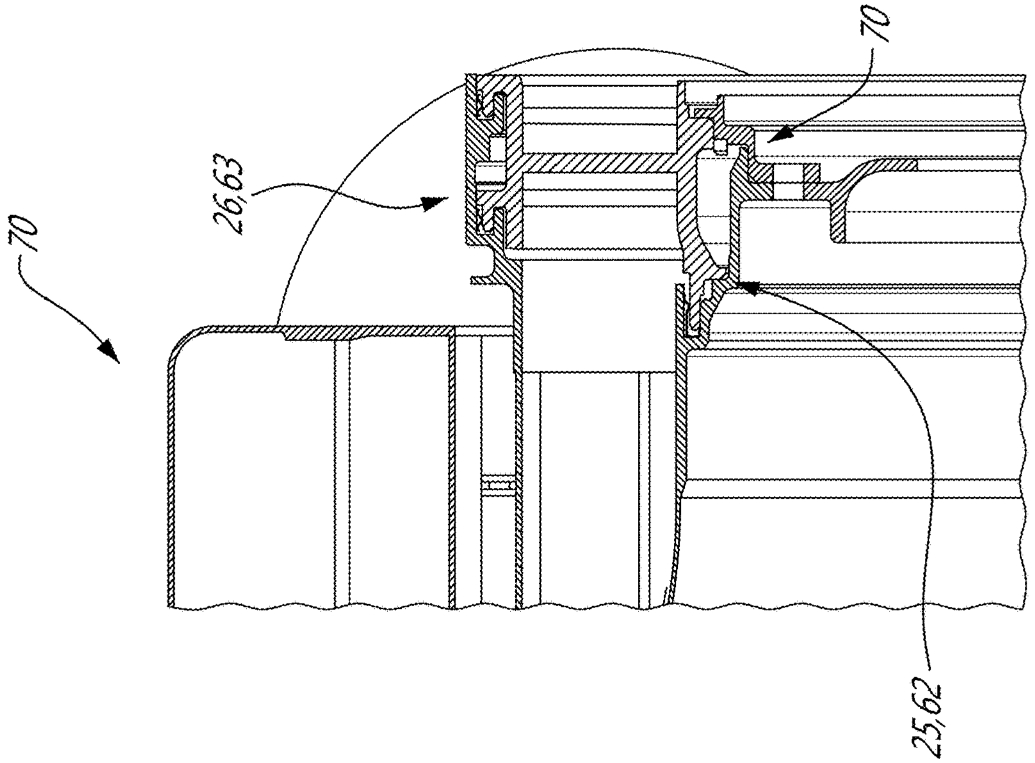
Figure 10:
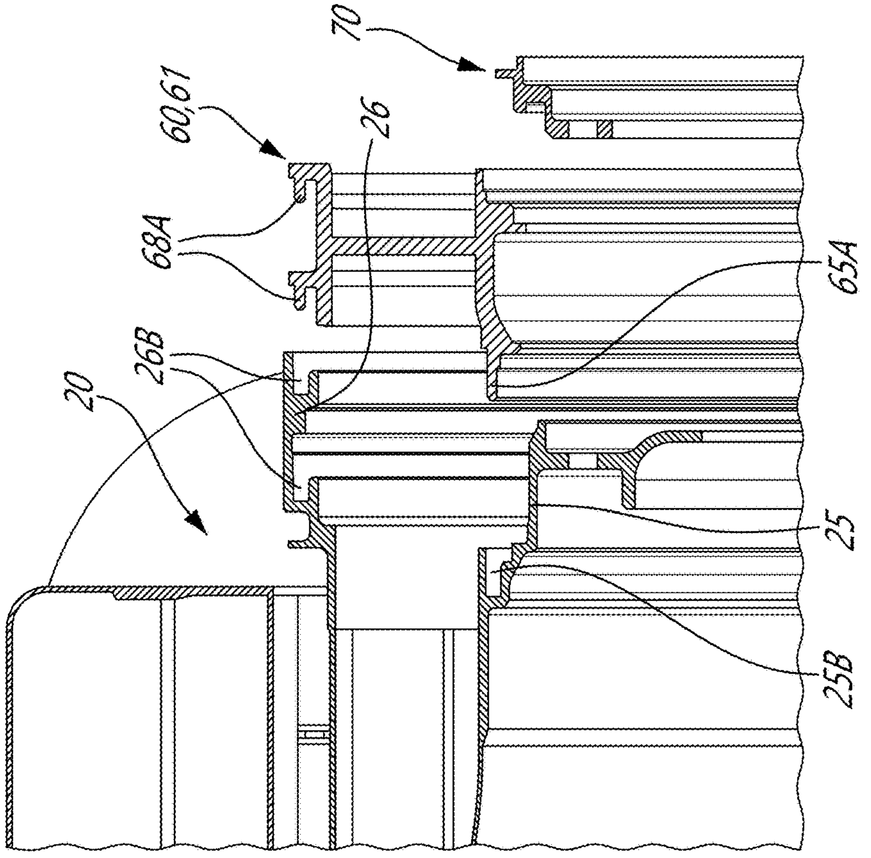

Referring now to FIGS. 9-11, a sequence of steps used to assemble the stator 60 to the scroll case 20 are described below.

To assemble the stator 60 and the vanes 61 to the scroll case 20, the stator 60 may be aligned so as to be coaxial with the central axis A and moved axially towards the scroll case 20 until the inner shroud mounting interface 65 engages the inner wall 25 and until the outer shroud mounting interface 68 engages the outer wall 26. As described above, this is done by engaging the outer hooks 68A to the outer slots 26B and the inner tab 65A to the inner slot 25B. At which point, the stator 60 and the vanes 61 may be axially locked within the conduit 21 of the scroll case 20 by the locking member 70. This includes engaging the slots 62A by the lugs 72 to circumferentially lock these two components together and abutting the rear stopper 73 against the inner shroud 62. The locking member 70 may then be secured (e.g., fastened) to the scroll case 20 and/or to the bearing housing 30. As shown in FIG. 10, sufficient clearance is provided to allow the outer hooks 68A to be inserted in the outer slots 26B while allowing the insertion of the inner tab 65A in the inner slot 25B.

The disclosed configuration may offer significant cost savings since the vanes are not an integral part of the scroll case 20. Manufacturing of these components may be facilitated while the ability to substitute the stator 60 and vanes 61 by another class of the same is provided. Put differently, if, after testing of the engine, it is determined that the flow circulating area at the trailing edges of the airfoils 64 of the vanes 61 is not optimal, it may be possible to easily remove the vanes 61 and replace them with another set of vanes having a different flow circulating area that will meet the desired requirements.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:

a scroll case extending around a central axis and having an inlet fluidly connected to a source of combustion gases and an outlet, a conduit extending around the central axis from the inlet to the outlet, the conduit including an outer wall and an inner wall located radially inwardly of the outer wall relative to the central axis, the outlet defined radially between the inner wall and the outer wall;

a turbine downstream of the outlet of the scroll case relative to a flow of the combustion gases; and vanes circumferentially distributed around the central axis, the vanes removably mounted to the scroll case proximate to the outlet of the conduit and radially between the inner wall and the outer wall, the vanes located upstream of the outlet of the scroll case relative to the flow of the combustion gases, a vane of the vanes has an inner shroud and an outer shroud, the inner shroud being removably mounted to the inner wall of the conduit via an inner shroud mounting interface, and the outer shroud being removably mounted to the outer wall of the conduit via an outer shroud mounting interface.

2. The aircraft engine of claim 1, wherein the outer shroud mounting interface includes an outer hook slidably engageable to an outer slot defined by the outer wall.

3. The aircraft engine of claim 2, comprising an outer sealing member disposed within the outer slot and radially compressed between the outer hook and the outer wall.

4. The aircraft engine of claim 2, wherein the outer hook and the outer slot includes two outer hooks and two outer slots, each of the outer slots having an opening oriented axially towards the turbine.

5. The aircraft engine of claim 1, wherein the inner shroud mounting interface includes an inner tab slidably engageable to an inner slot defined by the inner wall.

6. The aircraft engine of claim 5, wherein the inner slot has an opening oriented axially towards the turbine.

7. The aircraft engine of claim 5, comprising an inner sealing member disposed within the inner slot and radially compressed between the inner tab and the inner wall.

8. The aircraft engine of claim 1, comprising a locking member secured to the inner wall, axial movements of the vanes towards the turbine being blocked by the locking member.

9. The aircraft engine of claim 8, wherein the vanes are circumferentially locked to the scroll case via lugs defined by one of the inner shroud and the locking member and slots defined by the other of the inner shroud and the locking member.

10. A turbine assembly, comprising:

a scroll case extending around a central axis and having an inlet fluidly connected to a source of combustion gases and an outlet, and a conduit extending around the central axis from the inlet to the outlet, the conduit having an inner wall and an outer wall disposed radially outwardly of the inner wall relative to the central axis;

a turbine downstream of the outlet of the scroll case relative to a flow of the combustion gases; and vanes circumferentially distributed around the central axis and axially overlapping the conduit, the vanes removably mounted within the conduit of the scroll case, the vanes located upstream of the outlet of the scroll case relative to the flow of the combustion gases, a vane of the vanes having an inner shroud removably mounted to the inner wall via an inner shroud mounting interface and an outer shroud removably mounted to the outer wall via an outer shroud mounting interface.

11. The turbine assembly of claim 10, wherein the outer shroud mounting interface includes an outer hook slidably engageable to an outer slot defined by the outer wall.

12. The turbine assembly of claim 11, comprising an outer sealing member disposed within the outer slot and radially compressed between the outer hook and the outer wall.

13. The turbine assembly of claim 11, wherein the outer hook and the outer slot includes two outer hooks and two outer slots, each of the outer slots having an opening oriented axially towards the turbine.

14. The turbine assembly of claim 10, wherein the inner shroud mounting interface includes an inner tab slidably engageable to an inner slot defined by the inner wall.

15. The turbine assembly of claim 14, wherein the inner slot has an opening oriented axially towards the turbine.

16. The turbine assembly of claim 14, comprising an inner sealing member disposed within the inner slot and radially compressed between the inner tab and the inner wall.

17. The turbine assembly of claim 10, comprising a locking member secured to the inner wall, axial movements of the vanes towards the turbine blocked by the locking member.

18. The turbine assembly of claim 17, wherein the vanes are circumferentially locked to the scroll case via lugs defined by one of the inner shroud and the locking member and slots defined by the other of the inner shroud and the locking member.

* * * * *